Jan. 9, 1962 W. A. MOORE 3,015,946
DEVICE AND METHOD FOR PRODUCING LOW RATE ANGULAR ACCELERATION
Filed Jan. 28, 1957
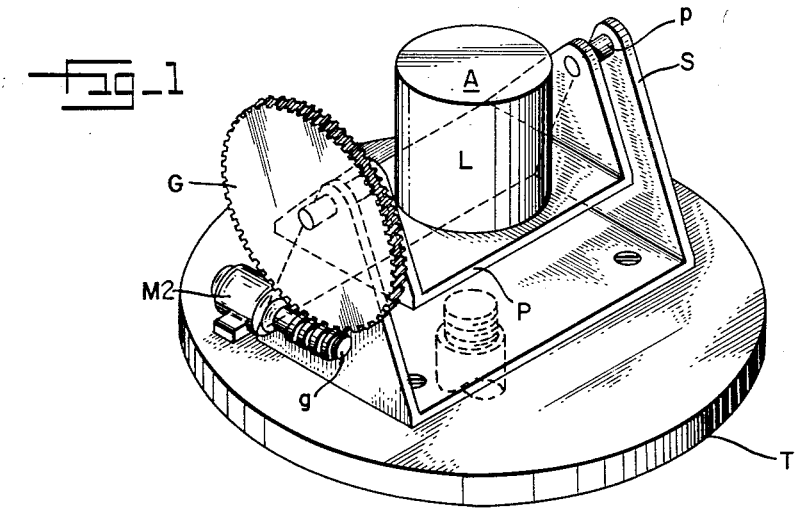
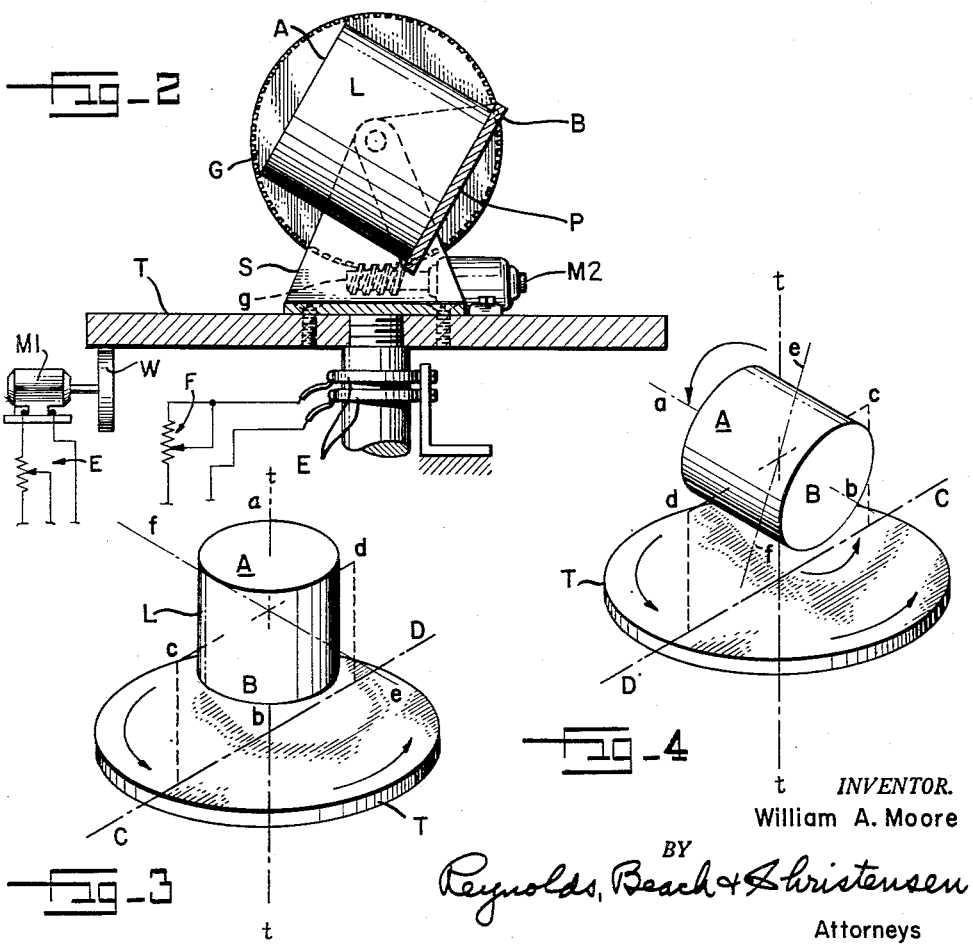
INVENTOR.
William A. Moore
BY
Reynolds, Beach & Christensen
Attorneys

United States Patent Office 3,015,946
Patented Jan. 9, 1962

3,015,946
DEVICE AND METHOD FOR PRODUCING LOW RATE ANGULAR ACCELERATION
William A. Moore, Seattle, Wash., assignor to Boeing Airplane Company, Seattle, Wash., a corporation of Delaware
Filed Jan. 28, 1957, Ser. No. 636,770
8 Claims. (Cl. 73—1)

It is necessary in certain physical procedures to measure accurately the angular acceleration of objects at low rates, to do which requires the calibration of an accelerometer at controlled rates within the low range indicated. For instance, there are devices whereby an accelerometer can be calibrated accurately to measure acceleration and deceleration cycles at a rate from ten cycles per second on upwardly, but not at a rate lower than ten c.p.s. Other devices, employing the principle of a torsion pendulum, can produce acceleration and deceleration at some one frequency, approximately one c.p.s., whereby an accelerometer can be calibrated to measure accurately at this frequency. This, however, left a gap in the calibration of accelerometers between about one c.p.s. and ten c.p.s., and so far as I am aware there has been heretofore no way of accurately attaining and calibrating acceleration and deceleration cycles of any given value within the low range generally indicated above, and on a constant basis. The present device and method are intended to fill this gap, and to provide a device and a method for producing and enabling the measurement of angular acceleration and deceleration at a controlled low rate in the range from less than one c.p.s. upwardly to at least ten c.p.s., whereby an accelerometer can be accurately calibrated in this range.

An angular accelerometer has internally a sensing element or elements which is or are displaceable in one sense in opposition to a spring force by an acceleration that occurs in the single plane wherein the spring force acts, such displacement occurring in the sense opposite to the sense of acceleration. Should acceleration occur in the opposite sense and of the same magnitude the sensing elements should be displaced oppositely to the sense of their first displacement, through the same number of radians. Sometimes the displacements in the opposite senses under such conditions are unlike, due to various causes. There is a mean between the two readings, and if the accelerometer is supported at and oscillated or rotated about a first axis normal to the plane in which the spring acts, and through the center of mass of the sensing elements—which is not necessarily the center of mass of the accelerometer as a whole—deflection is equal in the two opposite senses for like accelerations.

Rotation of the same accelerometer about a second axis at right angles to the first such axis—that is, about an axis that lies in the plane in which the spring force acts, which axis also includes the center of mass of the sensing elements—will produce no acceleration, that is, the acceleration of the sensing elements is zero, and there is no displacement of the sensing elements. If, however, an accelerometer is rotated simultaneously about the intersection of the two such axes, each inversion, top for bottom, and bottom for top, changes the acceleration of the sensing elements from a maximum to zero, back to the maximum in the opposite sense, again to zero, and then again to the maximum in the first sense. The number of reversals and the periodicity thereof depends upon the number of inversions during a given number of rotations about the first axis in a given period of time. From this, by regulating the number of rotations per second about the two axes, the number of accelerations per second can be determined accurately, and the accelerometer can be calibrated accordingly.

The point of intersection of the two axes, the one about which zero acceleration occurs and the one about which maximum acceleration occurs can be referred to as the electrical center of the accelerometer.

According to this invention an accelerometer that is to be calibrated within the range indicated is rotated simultaneously about two mutually perpendicular axes which intersect at the accelerometer's electrical center, at angular velocities which are related in the range from less than one to above ten. The alternate acceleration and deceleration can be shown to follow a sinusoidal curve. This is the preferred arrangement.

The principles of the invention will be better understood from the following description, taken in conjunction with the accompanying drawings, wherein the invention is shown in a largely diagrammatic form.

FIGURE 1 is an isometric view of a simplified form of the invention, and FIGURE 2 is a sectional view taken substantially along the line of one of the two axes of rotation.

FIGURES 3 and 4 are simplified diagrams, omitting most of the mechanical details, illustrating the principle of the invention.

The invention requires a turntable T rotative at a controlled rate about an axis $t$—$t$ (see FIGURE 3) which may be considered as vertically disposed, the rotation being unidirectional, as indicated by the arrows in FIGURE 3. To indicate a means to vary the rate of its rotation I have shown a motor M1 driving a wheel W contacting the turntable T, and variable in speed by the control at E, or the wheel W might be shiftable radially of the turntable. Carried upon and rotative with the turntable T is a yoke or standard S which supports a platform P for rotation about an axis $c$—$d$ that intersects the axis $t$—$t$ and which preferably is perpendicular to the axis $t$—$t$. The accelerometer has an electrical center, as already explained, and defined by the intersection of axes $a$—$b$ and $c$—$d$ (which is not necessarily the center of its mass nor its dimensional center), which should lie in the axis $t$—$t$. The intersecting axis of rotation $c$—$d$, which also includes the accelerometer's electrical center, is represented by the trunnions $p$, to one of which is connected a means for effecting rotation of the platform P at a controlled rate about the axis defined by the trunnions $p$ (the axis $c$—$d$ in FIGURES 3 and 4) while the platform and its support S are rotating with the turntable T about the axis $t$—$t$. The means for rotating the platform P may be, for instance, a gear wheel G and driving worm pinion $g$ driven by a motor M2 mounted upon the turntable, and receiving current by means of the slip rings E (FIGURE 2). The rotation of the platform P about its axis $t$—$t$ is also unidirectional. The rate of rotation about the axis $c$—$d$, may be varied at will, as by the control suggested at F. If we consider only rotation about the axis $t$—$t$, the body L will rotate in the direction $c$—$e$—$d$—$f$. We can not consider only this single rotation, however, for the body is rotating simultaneously— though perhaps at a different rate—about the axis $c$—$d$ so that its sense of rotation changes, by inversion, to bring its originally upper end A lowermost, and its originally lower end B uppermost. When the inversion is half-completed, acceleration of the accelerometer's sensing elements becomes zero. When inversion is complete, the rotation about the axis $t$—$t$ now effects rotation of the body L in the sense of $c$—$f$—$d$—$e$. There has been an acceleration and a deceleration to zero and a reversal and increase in acceleration to the maximum, which is repeated again and again as the simultaneous rotations continue. The rate of rotation of the platform P about axis $c$—$d$ is usually varied, to govern the output frequency of the accelerometer, although the rate of rotation about $a$—$b$ may also be varied. The velocity of the platform P and of the turntable T together will determine the peak angular acceleration. Speeds of rotation may be selected over a wide range. When the two speeds are constant, the instrument output will be sinusoidal.

To explain it somewhat differently, an angular accelerometer has one plane of sensitivity, that is, it will produce an output due to angular acceleration in one plane. It is, however, sensitive to angular acceleration in two senses (forward and reverse) in this one plane. This invention causes angular acceleration to occur in alternate senses, forward and reverse, in this one plane. When the accelerometer is mounted on the platform P with its electrical center located at the intersection of axes $a$—$b$ and $c$—$d$, the accelerometer will produce an output of equal amplitude in both senses alternately while the machine is running.

If the angular velocity of the turntable about axis $t$—$t$ be represented by $\omega_1$ and the angular velocity of the platform P about the axis $c$—$d$ be represented as $\omega_2$, and if by means such as those shown, or known in the art, the speed of the motor M2 can be varied to vary the ratio between $\omega_1$ and $\omega_2$, the rate of angular acceleration as thus effected can be varied from a ratio less than one, to a ratio between $\omega_2$ and $\omega_1$ in the vicinity of ten or better. This angular acceleration can be fixed at a constant rate by thus varying the velocities $\omega_1$ and $\omega_2$ relative to one another. If the angular velocities 1 and 2 are equal, and occur once each second, one acceleration and one deceleration occur each second, which is at the rate of two c.p.s. (deceleration being reverse or negative acceleration). If $\omega_2$ is doubled, $\omega_1$ remaining unchanged, the rate of c.p.s. is doubled, becoming four. If $\omega_1$ is doubled, $\omega_2$ remaining at a value of one, the rate of c.p.s. is halved, the rate of acceleration becoming now one c.p.s. The ratio of the angular velocities $\omega_1$ and $\omega_2$ governs the rate of acceleration.

I claim as my invention:

1. A device to produce angular acceleration of an accelerometer which is to be calibrated, and which has an electrical center at the intersection of the plane wherein its masses move during acceleration and the axis about which such masses accelerate, said device comprising a turntable, means to rotate the urntable unidirectionally about its own axis at a selected angular velocity $\omega_1$, a platform rotatably supported upon and rotatable with the turntable about the turntable's axis, means to rotate said platform unidirectionally about a second axis intersecting the turntable's axis at a selected angular velocity $\omega_2$, the accelerometer being arranged upon said platform with its elecrical center coinciding with the intersection of said axes, and means to vary the ratio of the velocities $\omega_2/\omega_1$ in the range from less than 1 upwardly to a value of at least 10.

2. A device as in claim 1, including means to vary the angular velocity $\omega_2$ in effecting variation of the ratio $\omega_1/\omega_2$.

3. A device to produce angular acceleration of an accelerometer which is to be calibrated at a controlled low rate, and which has an electrical center at the intersection of the plane wherein its masses move during acceleration and the axis about which such masses accelerate, said device comprising a turntable and means to rotate the same unidirectionally about its own axis at a constant angular velocity $\omega_1$, upstanding yokes carried by said turntable and spaced at opposite sides of said first axis, a platform and means supporting said platform from said yokes for rotation about a second axis offset from the plane of the platform, and intersecting the first axis at right angles, the accelerometer to be calibrated being located on the platform with its electrical center coincident with the intersection of the two axes, a motor mounted upon the turntable for rotation with the latter about the turntable's axis, drive means including a gear coaxial with the second axis, operatively interconnecting said motor and said platform, for unidirectional rotation of the latter at a controlled rate $\omega_2$ about the second axis, and means to vary the ratio $\omega_1/\omega_2$.

4. A device as and for the purpose indicated in claim 1, wherein the axes of the turntable and of the platform intersect at right angles.

5. The method of calibrating an angular accelerometer such as has an electrical center at the intersection of the plane in which its masses swing and the axis about which they swing, within the range of less than 1 c.p.s. to at least 10 c.p.s., which comprises rotating the accelerometer about a first axis which extends through its electrical center at a constant angular velocity $\omega_1$, and simultaneously rotating the accelerometer about a second axis intersecting the first axis at the accelerometer's electrical center at a constant angular velocity $\omega_2$ which, in relation to the velocity $\omega_1$, effects such number of reversals top for bottom, and bottom for top, of the accelerometer during one revolution about the first axis as corresponds to the desired cycles per second within the range indicated.

6. The method of producing controlled angular acceleration as indicated in claim 5 in a sinusoidal manner, by orienting the two axes of rotation at right angles to one another, intersecting at the accelerometer's electrical center.

7. The method of calibrating an angular accelerometer as set forth in claim 5, which includes the step of varying the ratio $\omega_1/\omega_2$, to calibrate at different rates within the range indicated.

8. The method as set forth in claim 6, which includes the step of varying the velocity $\omega_2$, to effect variation in the ratio $\omega_1/\omega_2$.

References Cited in the file of this patent

UNITED STATES PATENTS

| | | |
|---|---|---|
| 443,695 | Copeland | Dec. 30, 1890 |
| 1,292,127 | Stevens | Jan. 21, 1919 |
| 2,255,028 | Long | Sept. 16, 1941 |
| 2,841,978 | Kohn | July 8, 1958 |

FOREIGN PATENTS

| | | |
|---|---|---|
| 1,032,822 | France | Apr. 1, 1953 |